July 25, 1939.    C. A. THOMAS    2,167,395
FRACTIONATING APPARATUS
Original Filed Aug. 5, 1935
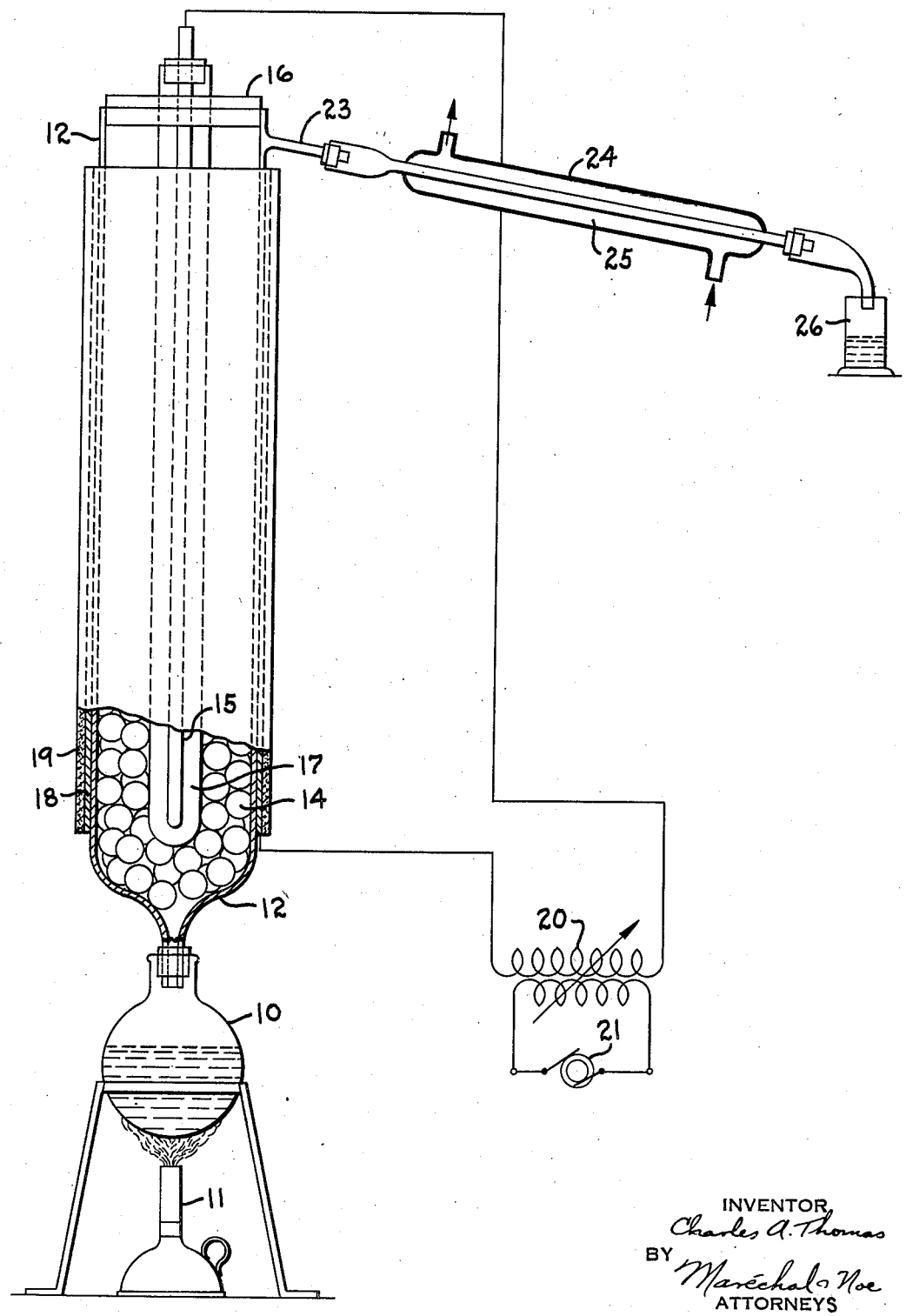
INVENTOR
Charles A. Thomas
BY Maréchal & Noe
ATTORNEYS Patented July 25, 1939

2,167,395

UNITED STATES PATENT OFFICE 2,167,395

FRACTIONATING APPARATUS

Charles A. Thomas, Dayton, Ohio, assignor, by mesne assignments, to Monsanto Chemical Company, St. Louis, Mo., a corporation of Delaware Original application August 5, 1935, Serial No. 34,690, now Patent No. 2,153,599. Divided and this application January 11, 1939, Serial No. 250,429

4 Claims. (Cl. 202—158)

This invention relates to apparatus for distilling or fractionating a mixture of vaporous or vaporizable constituents. Distillation, as the term is used herein, is applied to those operations where vaporization of a liquid mixture yields a vapor phase containing more than one constituent and where it is desired to recover one or more of these constituents in a relatively pure state.

It is the principal object of the invention to provide an apparatus for the rapid and effective distillation of a fluid mixture into its constituents.

It is a further object to provide distillation or fractionation apparatus for the separation of fluid mixtures of different boiling points having means associated therewith for providing a very accurate, complete and rapid separation of fluids of different characteristics.

It is a further object to provide distillation or fractionation apparatus of this character in which an electrostatic field is utilized to effect a rapid and complete distillation of a fluid mixture.

Other objects will be apparent from the description, the accompanying drawing, and the appended claims.

The single figure in the drawing shows, somewhat diagrammatically, a form of apparatus suitable for carrying out the invention.

This application is a division of application Serial No. 34,690 filed August 5, 1935, now Patent No. 2,153,599, granted April 11, 1939.

In the operation of a fractionation or distillation column it is desirable that all of the fluid of higher boiling point be removed from the gas within the column in order to obtain an effective separation and fractionation of the constituents of the fluid mixture. Difficulty has been experienced heretofore in freeing the gas of small quantities of the constituent of higher boiling point, in either gaseous or liquid state, the liquid particles in suspension having been in some degree entrained in the moving column of gas notwithstanding the fact that the rate of passage of the fluid through the column has been very slow.

In accordance with the present invention an apparatus is provided by means of which a much more accurate and complete fractionation is obtained, even of fluid mixtures which are difficult to fractionate; and furthermore the rate of passage of fluids through the column can be satisfactorily increased, thereby effecting considerable economy in the size of apparatus required. In accordance with this invention the fluid mixture during its passage through the column is subjected to forces which tend to effectively segregate the constituents of the mixture and to reduce or entirely eliminate objectionable entrainment of liquid particles. It has been found that very extraordinary results in effectiveness of separation are obtained by subjecting the fluid mixture during its passage through the column to the action of an electrostatic field. Such action has been found to very considerably improve the operation of the column, and to provide for the discharge of a substantially pure fluid constituent substantially free of other undesired fluids. Thus when the column is operated under comparable conditions first without the electrostatic field and then with the field, a very much better fractionation is obtained, increased rates of operation are possible, and fluid mixtures which have been separable only with great difficulty heretofore are satisfactorily distilled.

The exact theoretical effect of the electrostatic field is not entirely understood, but it is believed to be highly effective in removing particles of condensed liquid from suspension. The field being effective in the zone and at the time the liquid particles are being formed, these particles, as soon as they are formed, are caused to coalesce with each other into larger particles and to travel to fixed surfaces within the column, where they aggregate to form larger drops or a film of liquid which passes down and returns as reflux. There is thus a quite complete removal of the liquid particles from suspension. The increase in the size of the suspended particles is though to have a further important effect in reducing the vapor pressure of the condensed liquid so that there is less vapor pressure of its gas in the uncondensed fluid, with a resultant further decrease in the quantity of such condensed fluid which passes upwardly through the tube. Thus a much more highly effective and complete removal of one constituent from the other is obtained.

Referring to the drawing, there is shown an embodiment of apparatus for practicing the present invention. The apparatus includes a heating chamber 10 adapted to receive the fluid mixture to be fractionated, with a source of heat 11 positioned therebelow, and with a connection to the distillation column 12 providing for the introduction of the vaporized fluid mixture thereinto. The mixture containing constituents of different boiling points or vapor pressure characteristics that it is desired to separate is supplied to the chamber 10 and, upon the application of suitable quantities of heat, the mixture if not already in the vapor state is caused to become vaporized and passes upwardly through the column 12. The rate of vaporization is preferably so controlled that the vapors pass up through the column at a relatively slow rate.

The column 12 into which the vapors are thus introduced comprises what is known as a packed column, and may be entirely filled with inert bodies 14 such as glass beads or the like which provide a large surface area. An inner conductor 15 is positioned substantially axially of the cylindrical column, and passes in sealed relation through cover member 16 at the top of the column. This conductor may be either a bare metal conductor or may comprise a metallic conductor enclosed in a glass shield where it is desired to avoid contact between a metal conductor and the fluids within the tube. In the arrangement shown conductor 15 is encased within a glass or other suitable tube 17 so that contact with the fluids is effectively prevented.

A metal sheath 18 is positioned around the outside of the column to constitute the other conductor, and overlying conductor 18 there may be provided suitable heat insulation 19. Such heat insulation 19 is provided to assure that a proper temperature gradient occurs throughout the entire extend of the column, and may be suitably proportioned to obtain this result. Preferably the temperature condition is so controlled as to obtain substantially a continuous and uniform decrease in temperature from the bottom to the top of the column. In some cases auxiliary heating means may be disposed throughout the column if necessary to maintain the proper temperature gradient.

The two conductors are supplied with energy from a suitable source such as secondary terminals of transformer 20 which in turn may be energized from a suitable source of power, shown as generator 21. As illustrative of the character of energizing force which has been found to give entirely satisfactory results, the primary of the transformer may be energized from a 110 volt, 60 cycle line, and the transformer may have such characteristic that it will produce a secondary voltage of the order of 15,000 volts. The voltage may be considerably in excess of or below this value, and preferably the transformer is of variable transformation ratio so that variations may be made in the secondary voltage to provide the conditions most satisfactory for the particular operation. Also a direct current of suitable potential may be used in which case suitable rectifying and capacitance means are provided in the secondary circuit of the transformer.

An offtake 23 communicating with the interior of the column below the top thereof provides for the withdrawal of uncondensed gases passing through the column and substantially entirely freed of higher boiling point constituents. These gases may be led through a suitable condenser 24, to which a cooling fluid 25 may be provided to effect condensation of the gas, whereupon it may be collected in a receiver 26.

The operation of this apparatus is substantially as follows. The mixture of gases passes upwardly into the column upon being vaporized, and as it passes into the column and into zones of gradually decreasing temperature, the higher boiling point constituent tends to condense out. The bodies 14 provide additional surfaces of contact upon which such condensation particles may collect and aggregate to form a film of liquid. Upon the application of the electrostatic field, this agglomerating action is greatly accelerated, and the individual condensed particles are caused to quickly form larger particles of liquid, and are afforded a large number of surfaces upon which to collect and run down the column as reflux. Entrainment of condensed particles is thereby reduced very substantially, and the lower boiling point constituent which leaves the column in the vapor state is discharged therefrom in a high degree of purity.

As a specific example, very satisfactory results have been secured in the separation of chloroform and carbon tetrachloride, two liquids which boil within approximately 15 degrees of each other. This mixture was vaporized and passed through a glass column 20 millimeters in diameter and approximately 3 feet in height. The column was packed with glass beads and provided with electrodes as described above. A reflux ratio of 4 to 1 was maintained and an equal volume mixture of carbon tetrachloride and chloroform were distilled. (Reflux ratio is defined as the ratio of the volume of condensate returned to the column to that withdrawn as product.) The distillation was conducted with and without an electrostatic field, the voltage being 15,000 volts. In both cases the vapor rate through the column, the reflux ratio and the condensate withdrawn were held constant. The purity of the components obtained or the degree of fractionation obtained, was determined in both cases by measurement of the refractive index of the components. Without the electrostatic field each successive portion delivered from the column showed some increase in refractive index indicating the failure to distill a pure fraction of choloroform, while when distilling in the presence of the electrostatic field the index of refraction measurements corresponded to those of pure chloroform and carbon tetrachloride respectively, indicating that substantially pure fractions were being obtained.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A distillation column of the character described for effecting complete separation of a mixture of fluids of different boiling point characteristics, comprising means for vaporizing said mixture of fluids to a gaseous state and for passing said gaseous mixture into said column, an electrode extending into said column substantially centrally thereof, another electrode cooperating with said first electrode and positioned along the wall of said column, a plurality of inert bodies substantially filling the space between said first electrode and the wall of said column and providing additional surfaces of contact upon which condensation particles may collect and aggregate to form a film of liquid, and means including said electrodes for subjecting the fluid within the column and in the presence of said bodies to a high intensity electrostatic field adapted to control the particle size and precipitation of condensed liquid particles, to effect complete separation of one of said fluid constituents from the other.

2. A distillation column of the character described for effecting complete separation of a mixture of fluids of different boiling point characteristics, comprising means for vaporizing said mixture of fluids to a gaseous state and for passing said gaseous mixture into said column, an electrode extending into said column substantially centrally thereof, another electrode cooperating with said first electrode and positioned along the wall of said column, a plurality of inert bodies substantially filling the space between said first electrode and the wall of said column and providing additional surfaces of contact upon which condensation particles may collect and aggregate to form a film of liquid, means for controlling the temperature gradient of the column to provide a predetermined decrease in temperature from the bottom to the top of the column, and means including said electrodes for subjecting the fluid within the column and in the presence of said bodies to a high intensity electrostatic field adapted to control the particle size and precipitation of condensed liquid particles, to effect complete separation of one of said fluid constituents from the other.

3. A distillation column of the character described for effecting complete separation of a mixture of fluids of different boiling point characteristics, comprising means for vaporizing said mixture of fluids to a gaseous state and for passing said gaseous mixture into said column, an electrode extending into said column substantially centrally thereof, means for enclosing said electrode and preventing contact thereof with the fluid in said column, another electrode cooperating with said first electrode and positioned along the wall of said column on the outside thereof, a plurality of inert bodies substantially filling the space between said first electrode and the wall of said column and providing a large area of contact upon which condensation particles may collect and aggregate to form a film of liquid, and means including said electrodes for subjecting the fluid in the column and in the presence of said bodies to a high intensity electrostatic field adapted to control the particle size and precipitation of condensed liquid particles, to effect complete separation of one of said fluid constituents from the other.

4. A distillation column of the character described for effecting complete separation of a mixture of fluids of different boiling point characteristics, comprising means for vaporizing said mixture of fluids to a gaseous state and for passing said gaseous mixture into said column, an electrode extending into said column substantially centrally thereof, means for enclosing said electrode and preventing contact thereof with the fluid in said column, another electrode cooperating with said first electrode and positioned along the wall of said column on the outside thereof, a plurality of inert bodies substantially filling the space between said first electrode and the wall of said column and providing a large area of contact upon which condensation particles may collect and aggregate to form a film of liquid, heat insulation means along said column outwardly of said other electrode for controlling the temperature gradient of the column to provide a predetermined decrease in temperature from the bottom to the top of the column, and means including said electrodes for subjecting the fluid in the column and in the presence of said bodies to a high intensity electrostatic field adapted to control the particle size and precipitation of condensed liquid particles, to effect complete separation of one of said fluid constituents from the other.

CHARLES A. THOMAS.